US012771610B2

(12) United States Patent
Ritchie et al.

(10) Patent No.: US 12,771,610 B2
(45) Date of Patent: Oct. 20, 2026

(54) SYSTEMS AND METHODS FOR NETWORK DEVICE DISCOVERY OVER ETHERNET ADVANCED PHYSICAL LAYER

(71) Applicants: Schneider Electric Systems USA, Inc., Foxboro, MA (US); Schneider Electric USA, Inc., Andover, MA (US)

(72) Inventors: Briane Ritchie, Foxboro, MA (US); Ling Wu, Andover, MA (US)

(73) Assignees: Schneider Electric Systems USA, Inc., Foxboro, MA (US); Schneider Electric USA, Inc., Andover, MA (US)

( * ) Notice: Subject to any disclaimer, the term of this patent is extended or adjusted under 35 U.S.C. 154(b) by 0 days.

(21) Appl. No.: 18/230,353

(22) Filed: Aug. 4, 2023

(65) Prior Publication Data

US 2024/0121159 A1 Apr. 11, 2024

Related U.S. Application Data

(60) Provisional application No. 63/414,619, filed on Oct. 10, 2022.

(51) Int. Cl.

| | |
|---|---|
| ***H04L 41/12*** | (2022.01) |
| ***H04L 9/40*** | (2022.01) |
| ***H04L 45/745*** | (2022.01) |
| ***H04L 61/5014*** | (2022.01) |
| ***H04L 101/622*** | (2022.01) |

(52) U.S. Cl.

CPC ............ *H04L 41/12* (2013.01); *H04L 45/745* (2013.01); *H04L 61/5014* (2022.05); *H04L 63/08* (2013.01); *H04L 2101/622* (2022.05)

(58) Field of Classification Search

CPC ............. H04L 61/5014; H04L 12/2807; H04L 2101/622; H04L 41/12; H04L 45/745; H04L 63/08

See application file for complete search history.

(56) References Cited

U.S. PATENT DOCUMENTS

| | | | | |
|---|---|---|---|---|
| 8,442,526 B1 * | 5/2013 | Bertz | H04W 8/04 455/433 |
| 11,233,696 B1 * | 1/2022 | Kumar | H04L 41/0803 |
| 2003/0018710 A1 * | 1/2003 | Choi | H04L 61/5007 709/203 |

(Continued)

OTHER PUBLICATIONS

European Search Report and Search Opinion dated Feb. 22, 2024 for corresponding European Patent No. EP23199584.6, 7 pages.

(Continued)

*Primary Examiner* — Madhu Woolcock

(74) *Attorney, Agent, or Firm* — FIG. 1 Patents

(57) ABSTRACT

A method for automatic discovery of a Field Device during initial commissioning includes registering a Media Access Control (MAC) address of the Field Device with a Distributed Control System (DCS), and registering the Field Device with a Dynamic Host Configuration Protocol (DHCP) Server. An IP address may be assigned to the Field Device using the DHCP Server, and a DHCP client table may be polled using the DCS to recognize the MAC address of the Field Device. In response to the DCS recognizing the MAC address of the Field Device, the Field Device may be authenticated and authorized using the DCS.

20 Claims, 7 Drawing Sheets

Initial Commissioning

1) User registers Field Device MAC address with DCS
2) Field Device registers with DHCP Server, Gets assigned IP address
3) DCS async polls DHCP client table and recognizes Field Device MAC Address
4) DCS authenticates and authorizes Field Device

(56) References Cited

U.S. PATENT DOCUMENTS

| | | | | |
|---|---|---|---|---|
| 2004/0249961 | A1* | 12/2004 | Katsube | H04L 63/083 709/229 |
| 2005/0280862 | A1* | 12/2005 | Fukushima | H04L 67/025 358/1.15 |
| 2006/0015714 | A1* | 1/2006 | Hirano | H04L 63/08 713/151 |
| 2006/0031488 | A1* | 2/2006 | Swales | H04L 61/5014 709/224 |
| 2006/0137005 | A1* | 6/2006 | Park | H04L 63/0876 726/21 |
| 2008/0313320 | A1 | 12/2008 | Cheng et al. | |
| 2009/0172143 | A1* | 7/2009 | Ishimoto | H04L 41/08 709/223 |
| 2009/0292915 | A1* | 11/2009 | Sakane | H04L 67/12 707/E17.014 |
| 2012/0084840 | A1* | 4/2012 | Higuchi | H04L 61/5014 726/4 |
| 2015/0066979 | A1* | 3/2015 | Zhang | G06F 16/245 707/769 |
| 2015/0222632 | A1* | 8/2015 | Ichijo | G06F 21/30 726/7 |
| 2016/0125516 | A1* | 5/2016 | Fu | G06Q 10/20 705/27.1 |
| 2017/0272398 | A1* | 9/2017 | Cho | H04L 67/75 |
| 2017/0339102 | A1* | 11/2017 | Chhuor | H04L 61/5014 |
| 2018/0083917 | A1* | 3/2018 | Xu | H04L 41/12 |
| 2018/0212974 | A1 | 7/2018 | Onoda et al. | |
| 2018/0367518 | A1* | 12/2018 | Singh | H04L 63/06 |
| 2019/0139553 | A1* | 5/2019 | Kishida | G10L 17/00 |
| 2021/0003996 | A1* | 1/2021 | Nagabhairava | G05B 19/4183 |
| 2022/0075354 | A1* | 3/2022 | Nixon | H04L 43/0817 |
| 2022/0387912 | A1* | 12/2022 | Dannemann | B01D 33/073 |
| 2023/0291599 | A1* | 9/2023 | Ando | H04L 41/085 |
| 2024/0056320 | A1* | 2/2024 | Swarr | H04L 12/10 |

OTHER PUBLICATIONS

European Examination Report pursuant to Art. 94(3) EPC dated Dec. 4, 2024 for corresponding EP Application No. 23 199 584.6, 6 pages.
Response to Examination Report pursuant to Art. 94(3) EPC dated Dec. 4, 2024 for corresponding EP Application No. 23 199 584.6, 55 pages (Apr. 2025).
European Office Action dated Jun. 23, 2025 for corresponding EP Application No. 23199584.6, 6 pages.

* cited by examiner

Initial Commissioning

1) User registers Field Device MAC address with DCS
2) Field Device registers with DHCP Server, Gets assigned IP address
3) DCS async polls DHCP client table and recognizes Field Device MAC Address
4) DCS authenticates and authorizes Field Device

SYSTEMS AND METHODS FOR NETWORK DEVICE DISCOVERY OVER ETHERNET ADVANCED PHYSICAL LAYER

The present application claims priority to U.S. Provisional Patent Application Ser. No. 63/414,619, filed Oct. 10, 2022. The disclosure of the above-identified prior U.S. Patent Applications, in its entirety, is considered as being part of the present application, and thus, is incorporated herein by reference in its entirety.

FIELD

This disclosure relates generally to network device discovery, and more particularly, to systems and methods relating to automatic discovery of Field Devices over Ethernet Advanced Physical Layer (Ethernet-APL).

BACKGROUND

As is known, an industrial operation or plant typically includes a plurality of industrial equipment. The industrial equipment can come in a variety of forms and may be associated with various processes, for example, depending on the industrial operation. For example, an industrial operation may include one or more Field Devices (e.g., RTUs, PLCs, actuators, sensors, HMIs) that are used to perform, analyze and/or control process variable measurements. These process variable measurements may include pressure, flow, level, and temperature, for example. The industrial operation or plant, and its associated equipment and process (es), may be operated and controlled using a Distributed Control System (DCS) in some instances.

SUMMARY

Disclosed herein are systems and methods providing a mechanism for automatic discovery of a field device such as for example networked Field Device in a distributed control system.

In one aspect of this disclosure, a method and system for automatic discovery of a field device are provided. The method and system can involve: registering a device identifier of the field device with a distributed control system for a plant or process during initial commissioning; polling a network table for a network, on which the device identifier of the field device is pre-registered or is registered when connected to the network, using the distributed control system to recognize the device identifier of the field device, the network table storing at least a device identifier and an assigned network address for devices registered with a network server of the network; and in response to the distributed control system recognizing the device identifier of the field device, authenticating and authorizing the field device using the distributed control system.

The method and system can further involve: registering the field device with a network server of the network; assigning a network address to the field device using the network server; and updating the network table with the assigned network address for the associated device identifier of the field device. In various embodiments, the network table can be asynchronously polled.

In one aspect of this disclosure, the device identifier can be a Media Access Control (MAC) address, the network address can be an IP address, the network server can be a Dynamic Host Configuration Protocol (DHCP) Server, and/or the network table can be a DHCP client table. The DHCP client table can be asynchronously polled by the distributed control system to recognize the device identifier of the field device.

In one aspect of this disclosure, the field device can be commissioned in an intrinsically safe region for the plant or process, the distributed control system can be a distributed control system for an industrial plant or process, and/or communication with or by the field device over the network can be conducted via Ethernet-APL.

In one aspect of this disclosure, the system and method can further involve: preloading a predefined device identifier into a replacement field device, the predefined device identifier of the replacement field device corresponding to a device identifier of a field device to be replaced on the network; polling the network table for a network, on which the replacement field device is pre-registered or is registered when connected to the network, using the distributed control system to recognize the device identifier of the replacement field device; and in response to the distributed control system recognizing the device identifier of the replacement field device, authenticating and authorizing the replacement field device using the distributed control system.

In one aspect of this disclosure, a method for automatic discovery of a Field Device during initial commissioning includes registering a Media Access Control (MAC) address of the Field Device with a Distributed Control System (DCS), and registering the Field Device with a Dynamic Host Configuration Protocol (DHCP) Server. An IP address may be assigned to the Field Device using the DHCP Server, and a DHCP client table may be polled (e.g., asynchronously polled) using the DCS to recognize the MAC address of the Field Device. In response to the DCS recognizing the MAC address of the Field Device, the Field Device may be authenticated and authorized using the DCS.

In one aspect of this disclosure, a method for automatic discovery of a Field Device during field replacement includes preloading a MAC address into the replacement Field Device, and registering the replacement Field Device with a DHCP Server. An IP address may be assigned to the replacement Field Device using the DHCP Server, and a DHCP client table may be polled (e.g., asynchronously polled) using the DCS to recognize the MAC address of the replacement Field Device. In response to the DCS recognizing the MAC address of the replacement Field Device, the replacement Field Device may be authenticated and authorized using the DCS.

In one aspect of this disclosure, the Field Device (e.g., initially commissioned Field Device and/or replacement Field Device) is automatically discovered upon connection of the networked Field Device using a single pair point-to-point Ethernet Advanced Physical Layer (Ethernet-APL). For example, a preregistered MAC address may be used as a unique identifier for the Field Device, allowing recognition of the new or replacement Field Device as soon as it is connected to the DCS components. In one example implementation, recognition is done via monitoring for the DHCP Server serving the APL switch registered clients. A secure configurable MAC address is registered to a specific customer and/or location, allowing field upgrade/replacement with auto recognition by MAC address reuse.

It is understood that the disclosed systems and methods may be found suitable for use in numerous applications. The applications may include, for example, Oil and Gas, Energy, Food and Beverage, Water and Wastewater, Chemical, Petrochemical, Pharmaceutical, Metal, and Mining and Mineral applications.

It is understood that there are many features, advantages and aspects associated with the disclosed invention, as will be appreciated from the discussions below and drawings.

BRIEF DESCRIPTION OF THE DRAWINGS

The foregoing features of the disclosure, as well as the disclosure itself may be more fully understood from the following detailed description of the drawings, in which.

DETAILED DESCRIPTION OF EXAMPLE EMBODIMENTS

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

For convenience, certain introductory concepts and terms used in the specification are collected here.

As used herein, the term "Edge" is used to refer to Layer 0 of the Purdue Network Model for Industrial Control Systems.

As used herein, the term "Field Device" is used to refer to Intelligent field instruments with embedded Control/Compute/measurement capability implemented on lower power embedded Microcontroller based platforms.

As used herein, the term "Machine Learning (ML)" is used to refer to the use and development of software that is able to learn and adapt without following explicit instructions, by using algorithms and statistical models to analyze and draw inferences from patterns in data.

As used herein, the term "Embedded Device" is used to refer to a combination of a microcontroller, memory, and input/output peripherals—that has a dedicated function within a larger system.

As used herein, the term "Networked" is used to refer to connected via ethernet.

As used herein, the term "High availability" is used to refer to a device or application that can operate at a high level, continuously, without intervention, for a given time period. High-availability infrastructure is configured to deliver quality performance and handle different loads and failures with minimal or zero downtime.

As used herein, the term "Intrinsically Safe (IS)" is used to refer to an approach to the design of equipment going into hazardous areas that reduces the available energy to a level where it is too low to cause ignition as certified by per IEC TS 60079-39 or ATEX.

Figure 1:
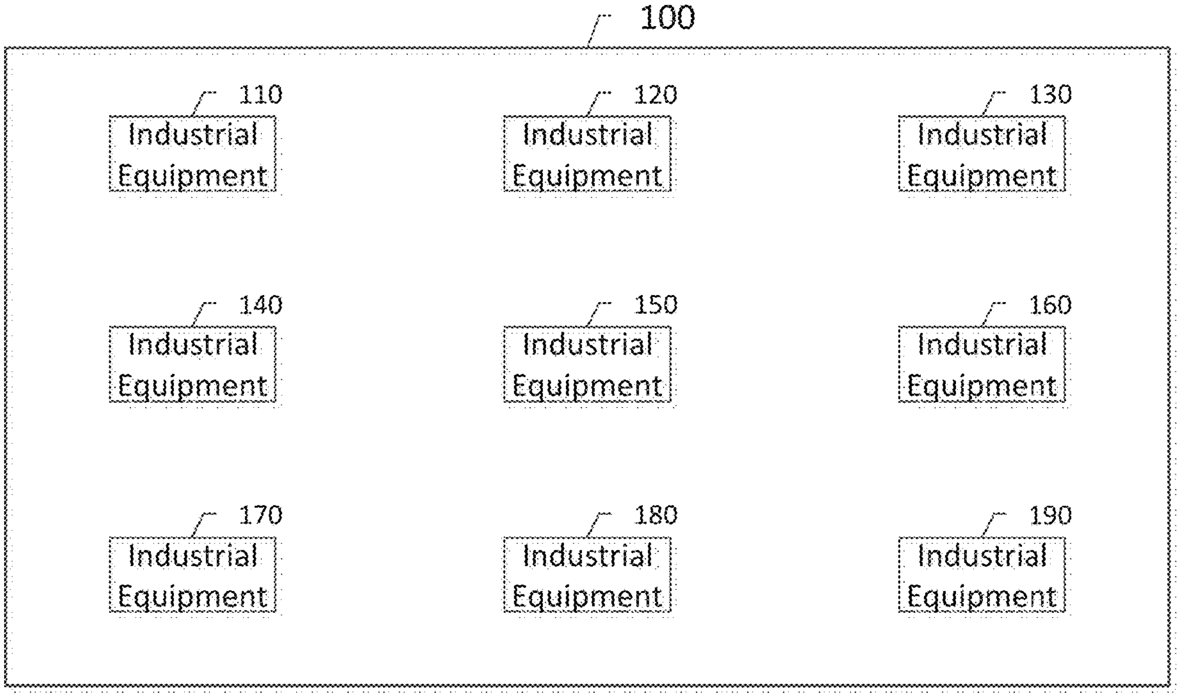
FIG. 1 shows an example industrial operation in accordance with embodiments of the disclosure.

Referring to FIG. 1, an example industrial operation 100 in accordance with embodiments of the disclosure includes a plurality of industrial equipment 110, 120, 130, 140, 150, 160, 170, 180, 190. The industrial equipment (or devices) 110, 120, 130, 140, 150, 160, 170, 180, 190 may be associated with a particular application (e.g., an industrial application), applications, and/or process(es). The industrial equipment 110, 120, 130, 140, 150, 160, 170, 180, 190 may include electrical or electronic equipment, for example, such as machinery associated with the industrial operation 100 (e.g., a manufacturing or natural resource extraction operation). The industrial equipment 110, 120, 130, 140, 150, 160, 170, 180, 190 may also include the controls and/or ancillary equipment associated with the industrial operation 100, for example, Field Devices (e.g., RTUs, PLCs, actuators, sensors, HMIs) that are used perform, analyze and/or control process variable measurements. In embodiments, the industrial equipment 110, 120, 130, 140, 150, 160, 170, 180, 190 may be installed or located in one or more facilities (i.e., buildings) or other physical locations (i.e., sites) associated with the industrial operation 100. The facilities may correspond, for example, to industrial buildings or plants. Additionally, the physical locations may correspond, for example, to geographical areas or locations.

The industrial equipment 110, 120, 130, 140, 150, 160, 170, 180, 190 may each be configured to perform one or more tasks in some embodiments. For example, at least one of the industrial equipment 110, 120, 130, 140, 150, 160, 170, 180, 190 may be configured to produce or process one or more products, or a portion of a product, associated with the industrial operation 100. Additionally, at least one of the industrial equipment 110, 120, 130, 140, 150, 160, 170, 180, 190 may be configured to sense or monitor one or more parameters (e.g., industrial parameters) associated with the industrial operation 100. For example, industrial equipment 110 may include or be coupled to a temperature sensor configured to sense temperature(s) associated with the industrial equipment 110, for example, ambient temperature proximate to the industrial equipment 110, temperature of a process associated with the industrial equipment 110, temperature of a product produced by the industrial equipment 110, etc. The industrial equipment 110 may additionally or alternatively include one or more pressure sensors, flow sensors, level sensors, vibration sensors and/or any number of other sensors, for example, associated the application(s) or process(es) associated with the industrial equipment 110. The application(s) or process(es) may involve water, air, gas, electricity, steam, oil, etc. in one example embodiment.

The industrial equipment 110, 120, 130, 140, 150, 160, 170, 180, 190 may take various forms and may each have an associated complexity (or set of functional capabilities and/or features). For example, industrial equipment 110 may correspond to a "basic" industrial equipment, industrial equipment 120 may correspond to an "intermediate" industrial equipment, and industrial equipment 130 may correspond to an "advanced" industrial equipment. In such embodiments, intermediate industrial equipment 120 may have more functionality (e.g., measurement features and/or capabilities) than basic industrial equipment 110, and advanced industrial equipment 130 may have more functionality and/or features than intermediate industrial equipment 120. For example, in embodiments industrial equipment 110 (e.g., industrial equipment with basic capabilities and/or features) may be capable of monitoring one or more first characteristics of an industrial process, and industrial equipment 130 (e.g., industrial equipment with advanced capabilities) may be capable of monitoring one or more second characteristics of the industrial process, with the second characteristics including the first characteristics and one or more additional parameters. It is understood that this example is for illustrative purposes only, and likewise in some embodiments the industrial equipment 110, 120, 130, etc. may each have independent functionality.

As discussed in the Background section of this disclosure, the industrial operation 100, and its associated equipment and process(es), may be operated and controlled using a Distributed Control System (DCS) in some instances.

Figure 2A:
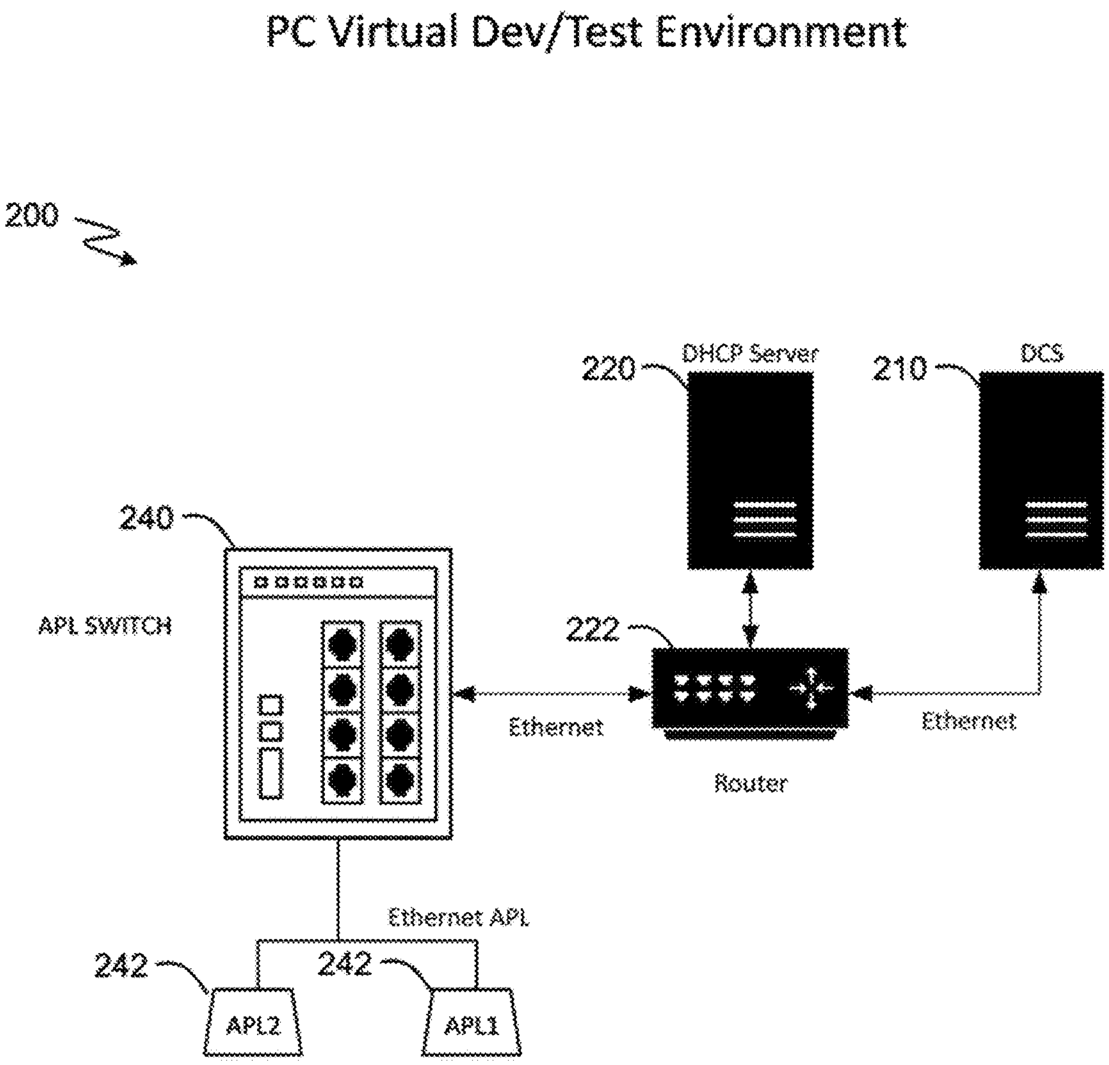
FIGS. 2A and 2B illustrate an example development and test environment in accordance with embodiments of the disclosure.
Figure 2B:
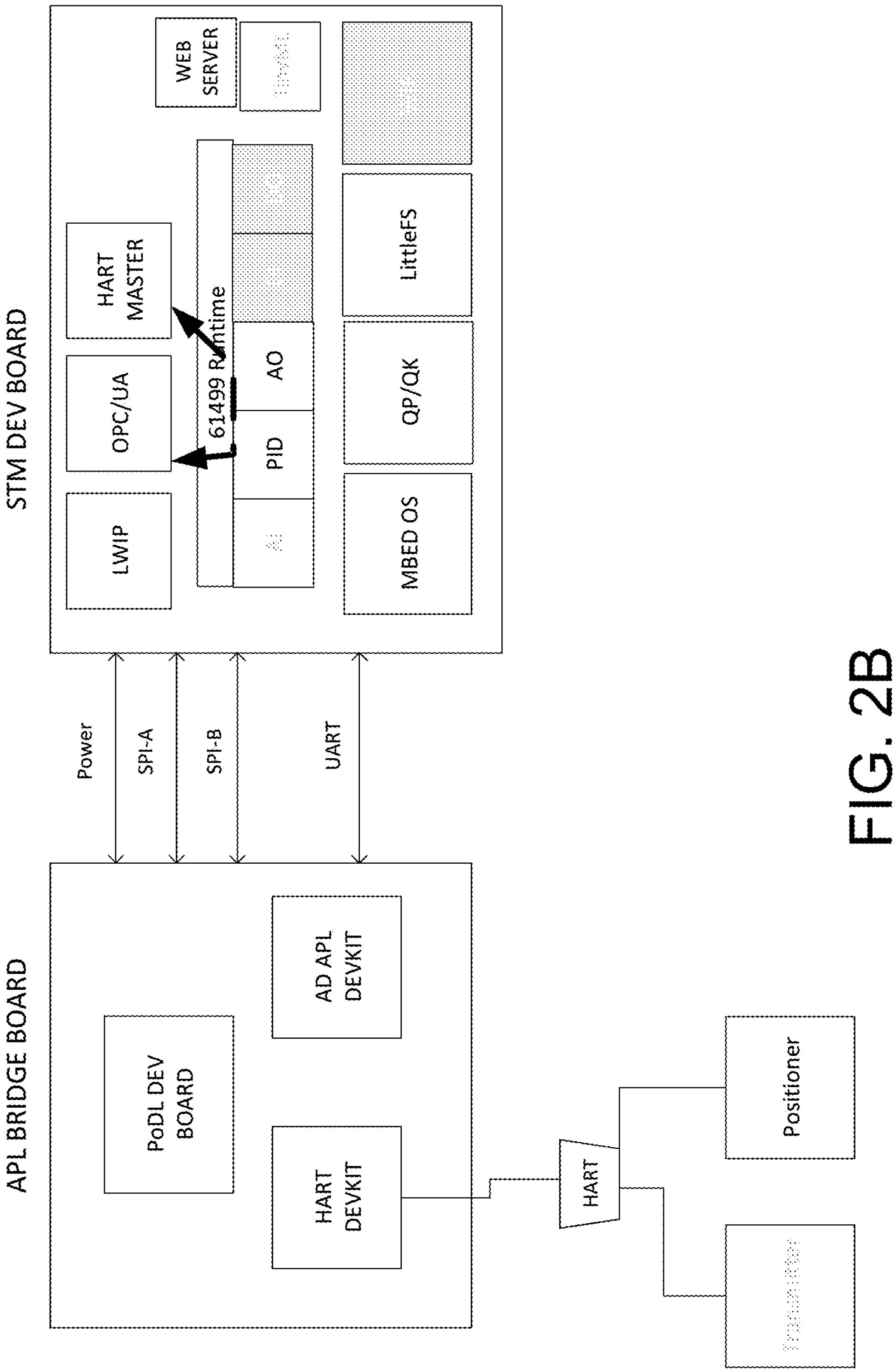

FIGS. 2A and 2B illustrate an example development and test environment in accordance with an aspect of this disclosure. As shown in FIG. 2A, the environment 200 can include networked devices and/or systems to facilitate monitoring and/or control of equipment in an industrial plant or process. The environment 200 can include a control system 210 for the plant or process and a plurality of Field Devices 230 (e.g., Transmitter, Positioner, etc.), which are communicatively connectable over a network(s) with network components including a network server 220, a router 222 and a network switch 240 for facilitating communication between the distributed control system 210 or network server 220 and the Field Devices over Ethernet.

In this example, the Field Devices 230 can communicate over Ethernet-APL via APLs 242 (e.g., APL1, APL2, . . . APLn, where n is the number of Field Devices). The control system 210 also can be a computerized control system such as a Distributed Control System (or DCS), and the network server 220 can be a DHCP server which can manage a network table such as a DHCP client table which can maintain information about the devices (on the network) such as the Field Devices. The information for each device, which is connected to the network, can include a device identifier (e.g., MAC address), an assigned network address (e.g., IP address) and other information as desired to facilitate network communication. Field Devices can be added or replaced for the plant or process in accordance with the automatic discovery and/or other processes described herein.

FIG. 2B illustrates computer or electronic components, such as APL Bridge Board and STM Development Board, which can be programmed to develop and test virtual network environments, including the example environment of FIG. 2A, for implementing the method and system of Field Device commissioning and replacement such as described herein. As shown in FIG. 2B, various Field Devices, e.g., Positioner or Transmitter, can be connected to the APL Bridge Board to test the automatic discovery and/or other processes related to Field Device commissioning or replacement such as described herein.

Figure 3:
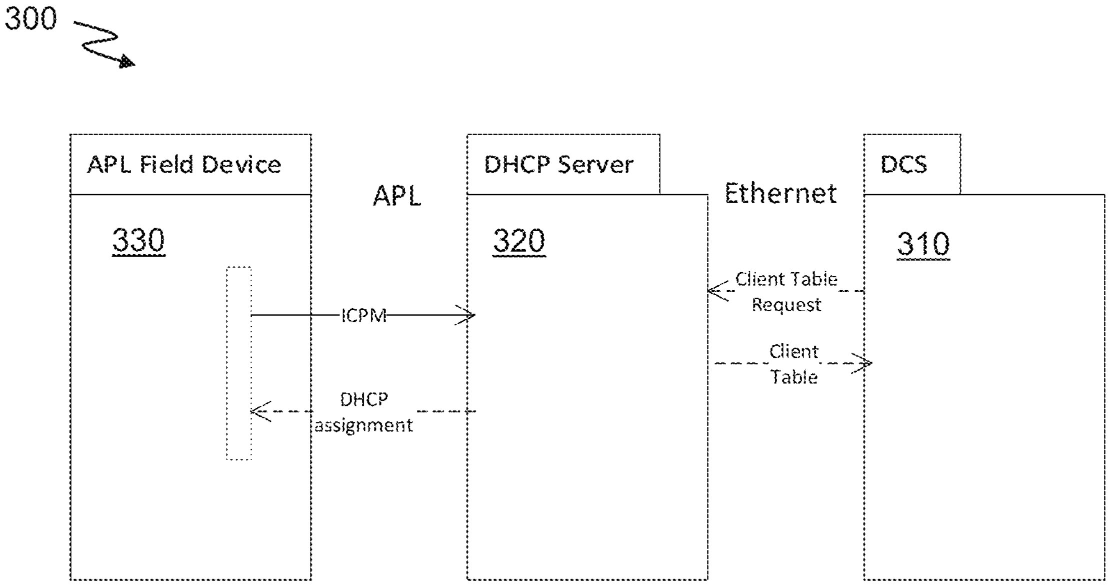
FIG. 3 illustrates an example process of automatic discovery of a Field Device during initial commissioning in accordance with embodiments of the disclosure.

FIG. 3 illustrates an example process 300 of automatic discovery of a Field Device during initial commissioning in accordance with embodiments of the disclosure. The process 300 will be described with reference to a control system 310 for a plant or process, a network server 320 and a Field Device 330. As shown, in this example, the control system 310 can be a distributed control system such as a DCS, the network server 320 can be a DHCP server, and the Field Device 330 can be an APL Field Device (e.g., Field Device which performs communication over Ethernet-APL). The various devices and systems are communicatively connected (or connectable) over a network(s). For example, the Field Device 330 and network server 320 can communicate over Ethernet-APL, and the control system 310 and the network server 320 can communicate over Ethernet.

The process 300 can begin with the Field Device 330 (to be commissioned) being registered with the control system 310. For example, a user can register the device identifier, e.g., a MAC address, of the Field Device with the control system 310 using a computer or user interface to the control system 310.

After the Field Device 330 is connected to the network, the Field Device 330 can be registered with the network server using its device identifier. For example, once connected or installed onto the network, the Field Device 330 and network server 320 can automatically communicate such that the network server 320 can receive the device identifier of the newly connected Field Device 330, and recognize the Field Device 330 on the network. The network server 320 can thereafter assign a network address to the recognized Field Device 330. The assigned network address can be associated with the device identifier and stored in a network Table (e.g., a DHCP Client Table), which can store such information for the Field Device and other networked devices on the network. The information on the network Table can be made accessible to other devices or systems on the network upon request, and can be managed by the network server 320.

The control system 310 can access the information on the network Table, and recognize the presence of the Field Device 330 by its device identifier. For example, the control system 310 can request information from the network Table for the Field Device 330, which is registered with the control system 310, using the device identifier. In various embodiments, the control system 310 can poll (e.g., asynchronously) the network table for information using the device identifier of the registered Field Device 330 (to be commissioned). If the device identifier is available on the network Table, then information for the Field Device 330 from the network Table is provided or returned to the control system 310. In the event that information is returned for the device identifier, the control system 310 recognizes the device identifier, and thus, the Field Device 330. In the event the Field Device 330 is recognized, the control system 310 can thereafter authenticate and authorize the Field Device 330.

Figure 4:
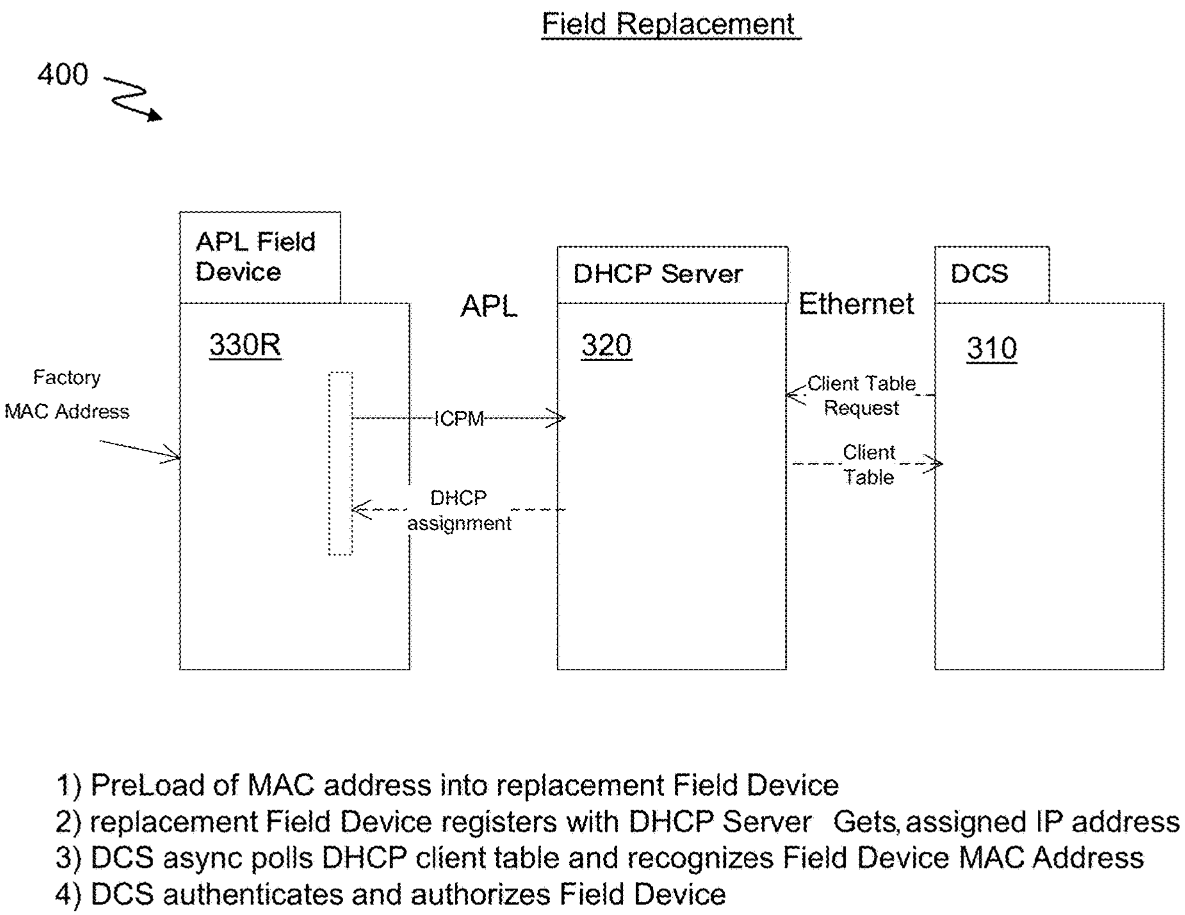
FIG. 4 illustrates an example process of automatic discovery of a Field Device during field replacement in accordance with embodiments of the disclosure.

FIG. 4 illustrates an example process 400 of automatic discovery of a Field Device during field replacement in accordance with embodiments of the disclosure. The process 400 will be described with reference to a control system 310 for a plant or process, a network server 320 and a replacement Field Device 330R. As shown, in this example, the control system 310 can be a distributed control system such as a DCS, the network server 320 can be a DHCP server, and the Field Device 330R can be an APL Field Device (e.g., Field Device which performs communication over Ethernet-APL). The various devices and systems are communicatively connected (or connectable) over a network(s). For example, the replacement Field Device 330R and network server 320 can communicate over Ethernet-APL, and the control system 310 and the network server 320 can communicate over Ethernet.

The process 400 can begin with the Field Device 330 (to be commissioned) being pre-loaded with a device identifier. The pre-loaded device identifier can be a predetermined (or predefined) device identifier, such as the device identifier (e.g., MAC address, etc.) of the Field Device, which is to be replaced and is to be disconnected and uninstalled from the network. If the replacement Field Device 330R is loaded with the same device identifier as the Field Device 330 to be replaced, it may be unnecessary to re-register the device identifier with the control system 310.

After the replacement Field Device 330R is communicatively connected to the network (e.g., wireline or wireless connection), the replacement Field Device 330R can be registered with the network server using its device identifier. For example, once connected or installed onto the network, the replacement Field Device 330R and network server 320 can automatically communicate such that the network server 320 can receive the device identifier of the newly connected replacement Field Device 330, and recognize the replacement Field Device 330R on the network. The network server 320 can thereafter assign a network address to the recognized replacement Field Device 330R. The assigned network address can be associated with the device identifier and stored in a network Table (e.g., a DHCP Client Table), which can store such information for the Field Device and other networked devices on the network. The information on the network Table can be made accessible to other devices or systems on the network upon request, and can be managed by the network server 320.

The control system 310 can access the information on the network Table, and recognize the presence of the replacement Field Device 330R by its device identifier. For example, the control system 310 can request information from the network Table for the Field Device, which is registered with the control system 310, using the device identifier. In various embodiments, the control system 310 can poll (e.g., asynchronously) the network table for information using the device identifier of the registered Field Device (to be commissioned). If the device identifier is available on the network Table, then information for the replacement Field Device 330R from the network Table is provided or returned to the control system 310. In the event that information is returned for the device identifier, the control system 310 recognizes the device identifier, and thus, the replacement Field Device 330R. In the event the replacement Field Device 330R is recognized, the control system 310 can authenticate and authorize the replacement Field Device 330R.

Figure 5:
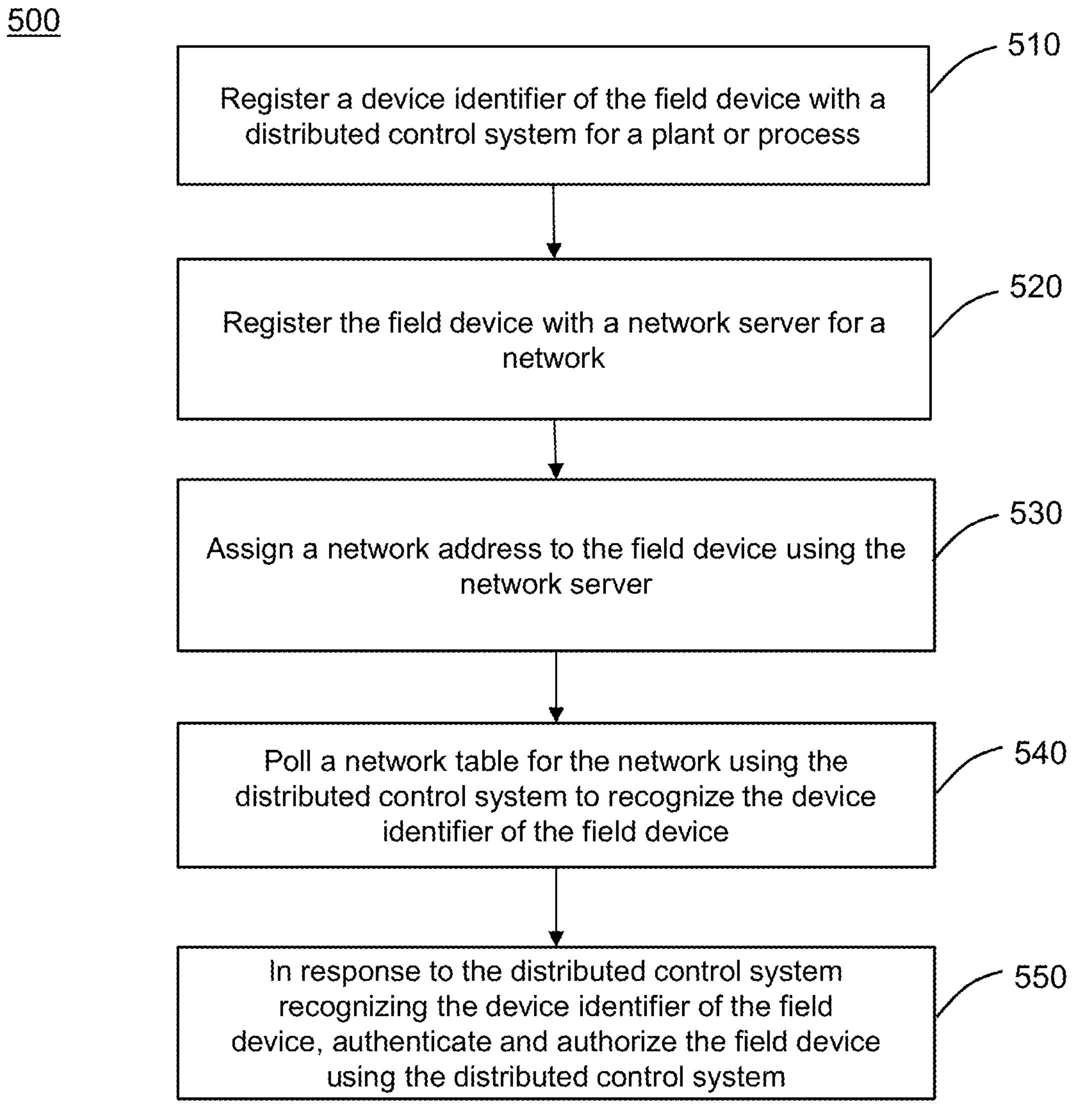
FIG. 5 illustrates an example process of automatic discovery of a Field Device during initial commissioning in accordance with embodiments of the disclosure.

FIG. 5 illustrates an example process 500 of automatic discovery of a Field Device during initial commissioning in accordance with embodiments of the disclosure. The process 500 will be described with reference to various computerized systems, such as a field device, network server, and a distributed control system, which are connected (or connectable) over a network. The various operations of the process 500 may be implemented by or under control of one or more processors of one or more of these computerized systems. The various information (or data) described herein may be stored in memory accessible to the one or more processors.

At block 510, the process 500 begins with the registration of a device identifier of a field device with a distributed control system for a plant or process. For example, a user, via a user computer or interface, can have the device identifier of the field device registered with the control distributed control system.

At block 520, the field device is registered with a network server for a communication network. For example, once the field device is installed and physically and/or communicatively connected to the network (e.g., via wireline or wireless connection), the network server can receive device information, such as a device identifier, from the field device over the network. The network server can automatically receive the device information once the field device is connected to the network.

At block 530, the network server assigns a network address to the field device.

At block 540, the distributed control system polls a network table for the network to recognize the device identifier of the field device. For example, the distributed control system can poll a network table for a network, on which the device identifier of the field device is pre-registered or is registered when connected to the network, to recognize the device identifier of the field device. The network table can store (or maintain) information, such as for example a device identifier and an assigned network address for devices registered with the network server of the network.

At block 550, in response to the distributed control system recognizing the device identifier of the field device, the distributed control system authenticates and authorizes the field device for use in the monitoring/control of the plant or process.

The automatic discovery process as described herein can be implemented on various types of systems and networks, such as a client/server environment, etc. For example, the device identifier can be a Media Access Control (MAC) address, the control system can be Distributed Control System (DCS), the network address can be an IP address, the server can be a Dynamic Host Configuration Protocol (DHCP) Server, the replacement field device can be commissioned in an intrinsically safe region for the plant or process, the distributed control system can be a distributed control system for an industrial plant or process, and/or communication with the field device over the network can be conducted via Ethernet-APL.

Figure 6:
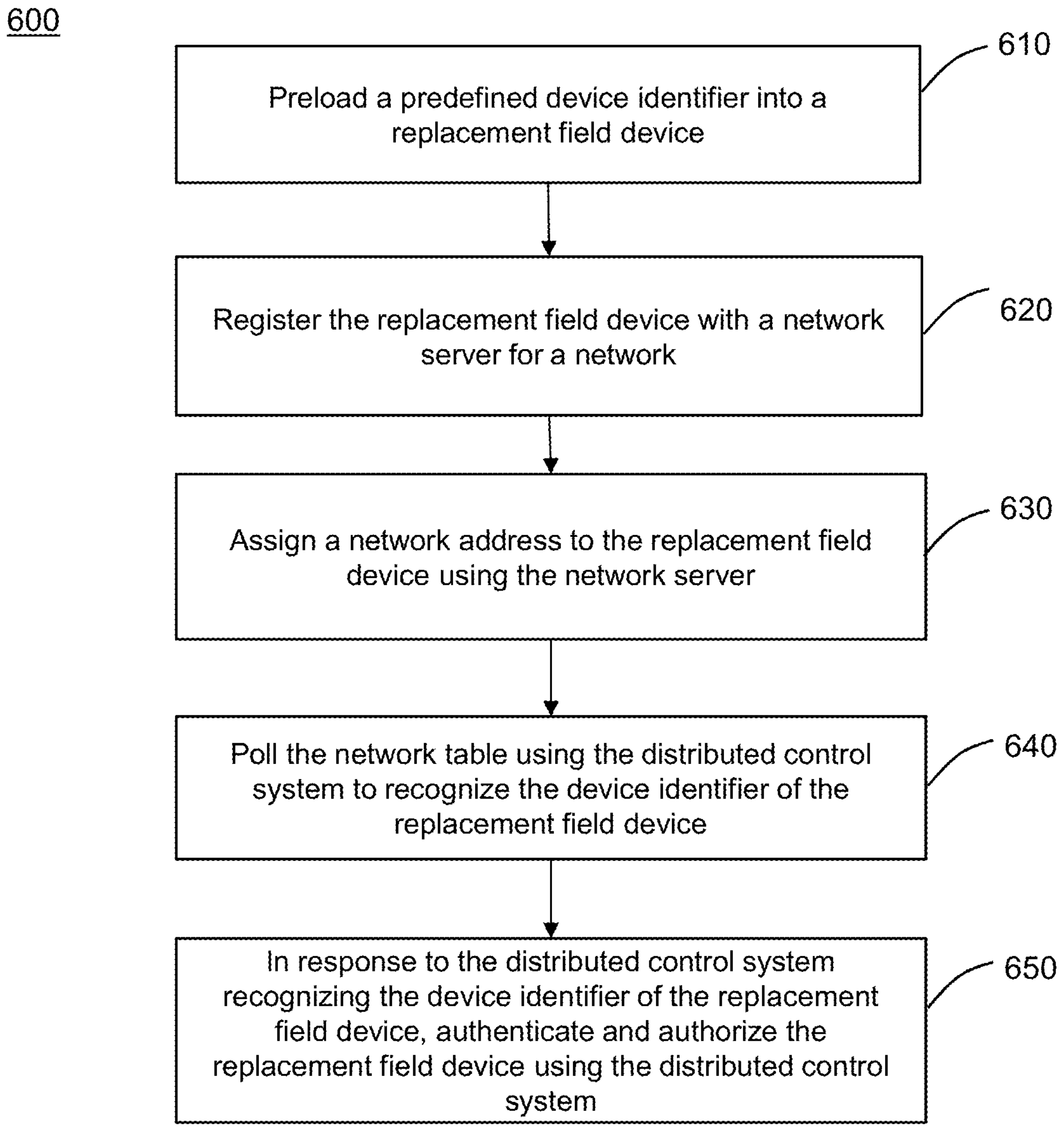
FIG. 6 illustrates an example process of automatic discovery of a Field Device during field replacement in accordance with embodiments of the disclosure.

FIG. 6 illustrates an example process 600 of automatic discovery of a Field Device during field replacement in accordance with embodiments of the disclosure. The process 600 will be described with reference to various computerized systems, such as a field device, network server, and a distributed control system, which are connected (or connectable) over a network. The various operations of the process 600 may be implemented by or under control of one or more processors of one or more of these computerized systems. The various information (or data) described herein may be stored in memory accessible to the one or more processors.

At block 610, the process 600 begins in which the replacement field device is preloaded with a predefined device identifier. The predefined device identifier of the replacement field device can correspond to a device identifier of a field device to be replaced on the network. The field device to be replaced can already have its device identifier registered with the network.

At block 620, the replacement field device is registered with a network server for a communication network. For example, once the replacement field device is installed and physically or communicatively connected to the network (e.g., via wireline or wireless connection), the network server can receive device information, such as a device identifier, from the field device over the network. The network server can automatically receive the device information once the replacement field device is connected to the network.

At block 630, the network server assigns a network address to the replacement field device.

At block 640, the distributed control system polls a network table for the network to recognize the device identifier of the replacement field device. For example, the distributed control system can poll a network table for a network, on which the device identifier of the replacement field device is pre-registered or is registered when connected to the network, using the distributed control system to recognize the device identifier of the field device. The network table can store (or maintain) information, such as for example a device identifier and an assigned network address for devices registered with the network server of the network.

At block 650, in response to the distributed control system recognizing the device identifier of the replacement field device, the distributed control system authenticates and authorizes the replacement field device for use in the monitoring/control of the plant or process.

The automatic discovery process as described herein can be implemented on various types of systems and networks, such as a client/server environment, etc. For example, the device identifier can be a Media Access Control (MAC) address, the control system can be Distributed Control System (DCS), the network address can be an IP address, the server can be a Dynamic Host Configuration Protocol (DHCP) Server, the replacement field device can be commissioned in an intrinsically safe region for the plant or process, the distributed control system can be a distributed control system for an industrial plant or process, and/or communication with the field device over the network can be conducted via Ethernet-APL.

As discussed above, and as illustrated by the figures, the disclosed invention can provide systems and methods for automatic discovery of a Field Device on an APL link via a DHCP and a preregistered MAC address, in various embodiments. Using the provided systems and methods, a Field Device may be automatically discovered upon connection of a networked Field Device using single pair point to point ethernet-APL.

Furthermore, in various aspects of this disclosure, the Field Device (e.g., initially commissioned Field Device and/or replacement Field Device) can be automatically discovered upon connection of the networked Field Device using a single pair point-to-point Ethernet-APL. For example, a preregistered MAC address may be used as a unique identifier for the Field Device, allowing recognition of the new or replacement Field Device as soon as it is connected to the DCS components. In one example implementation, recognition can be done via monitoring for the DHCP Server serving the APL switch registered clients. A secure configurable MAC address can be registered to a specific customer and/or location, allowing field upgrade/replacement with auto recognition by MAC address reuse.

Other possible features and advantages associated with the disclosed invention will be appreciated by one of ordinary skill in the art.

It is understood that embodiments of the disclosure herein may be configured as a system, method, or combination thereof. Accordingly, embodiments of the present disclosure may be comprised of various means including hardware, software, firmware or any combination thereof.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware, or any combination thereof.

Any resulting program(s), having computer-readable program code, may be embodied on one or more tangible or non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable or storage medium or in any transmitting medium which transmits such a program.

A processor(s), controller(s) or processing unit(s) as described herein can be a processing system, which can include one or more processors, such as CPU, controller, ASIC, or other processing unit or circuitry, which controls or performs the operations of the devices or systems, described herein. Memory/storage devices can include, but are not limited to, disks, solid state drives, optical disks, removable memory devices such as smart cards, SIMS, WIMs, semiconductor memories such as RAM, ROM, PROMS, etc. Transmitting mediums or networks can include, but are not limited to, transmission via wireline communication, wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, and other stationary or mobile network systems/communication links.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be appreciated that the concepts, systems, circuits and techniques sought to be protected herein are not limited to use in the example applications described herein (e.g., industrial applications), but rather may be useful in substantially any application where it is desired to receive decision support for each step in an automated fashion. While particular embodiments and applications of the present disclosure have been illustrated and described, it is to be understood that embodiments of the disclosure not limited to the precise construction and compositions disclosed herein and that various modifications, changes, and variations can be apparent from the foregoing descriptions without departing from the spirit and scope of the disclosure as defined in the appended claims.

Having described preferred embodiments, which serve to illustrate various concepts, structures and techniques that are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that the scope of the patent should not be limited to the described embodiments but rather should be limited only by the spirit and scope of the following claims.

What is claimed is:

1. A method for automatic discovery of a field device, the method comprising:

receiving, by a distributed control system of a network and via a user interface to the distributed control system, a Media Access Control (MAC) address of the field device for registering the field device with a plant or a process during initial commissioning;

in response to the field device connecting to the network, automatically communicating the MAC address of the field device to a network server of the network on an Advanced Physical Layer (APL) link, wherein the network server assigns a network address to the field device and stores the network address corresponding to the MAC address of the field device in a network table at the network server;

polling, by the distributed control system and using the MAC address of the field device that is registered with the distributed control system, the network table at the network server to recognize a presence of the field device installed on the network based at least in part on the network table comprising the MAC address of the field device, wherein the network table comprises MAC addresses and corresponding network addresses associated with respective field devices registered with the network server;

in response to the MAC address of the field device being available on the network table, returning the network address of the field device to the distributed control system;

in response to the network address of the field device being returned, recognizing, by the distributed control system, the presence of the field device; and authenticating and authorizing the field device for use in monitoring the plant or the process.

2. The method of claim 1, wherein the network table is asynchronously polled by the distributed control system to recognize the MAC address of the field device, and wherein the network table is a Dynamic Host Configuration Protocol (DHCP) client table.

3. The method of claim 1, further comprising:

connecting to the network server via Ethernet to poll the network table; and controlling, based at least in part on authenticating and authorizing the field device, an industrial operation comprising a plurality of industrial equipment, wherein an industrial equipment of the plurality of industrial equipment comprises the field device.

4. The method of claim 1, wherein the field device is commissioned in an intrinsically safe region for the plant or the process based at least in part on an available energy of the field device being below a level, the method further comprising communicating, by the distributed control system, with the field device over the network via the APL link.

5. The method of claim 1, further comprising:

preloading a predefined device identifier into a replacement field device, the predefined device identifier of the replacement field device corresponding to the MAC address of the field device based at least in part on the field device being replaced by the replacement field device on the network;

polling, by the distributed control system, the network table for the predefined device identifier of the replacement field device to recognize a presence of the replacement field device, wherein the replacement field device is pre-registered or is registered with the network server based at least in part on being connected to the network; and in response to the distributed control system recognizing the presence of the replacement field device, authenticating and authorizing the replacement field device to monitor the plant or the process.

6. The method of claim 5, wherein the network table comprises the predefined device identifier and an additional network address assigned for the predefined device identifier of the replacement field device.

7. The method of claim 5, wherein the predefined device identifier comprises the MAC address of the field device, and wherein the replacement field device is pre-registered with the network server based at least in part on the network table comprising the MAC address of the field device.

8. A system for automatic discovery of a field device, comprising:

a network server of a network; and a distributed control system for a plant or a process, the distributed control system configured to:

receive, via a user interface to the distributed control system, a Media Access Control (MAC) address of the field device for registering the field device with a plant or a process during initial commissioning;

in response to the field device connecting to the network, automatically communicate the MAC address of the field device to the network server on an Advanced Physical Layer (APL) link, wherein the network server assigns a network address to the field device and stores the network address corresponding to the MAC address of the field device in a network table at the network server;

poll, using the MAC address of the field device that is registered with the distributed control system, the network table at the network server to recognize a presence of the field device installed on the network based at least in part on the network table comprising the MAC address of the field device, wherein the network table comprises MAC addresses and corresponding network addresses associated with respective field devices registered with the network server;

in response to the MAC address of the field device being available on the network table, returning the network address of the field device to the distributed control system;

in response to the network address of the field device being returned, recognizing, by the distributed control system, the presence of the field device; and authenticate and authorize the field device for use in monitoring the plant or the process.

9. The system of claim 8, wherein the network server is configured to register the field device with the network.

10. The system of claim 8, wherein the network table is asynchronously polled to recognize the MAC address of the field device, and wherein the network table is a Dynamic Host Configuration Protocol (DHCP) client table.

11. The system of claim 8, wherein the distributed control system is further configured to:

connect to the network server via Ethernet to poll the network table; and control, based at least in part on authenticating and authorizing the field device, an industrial operation comprising a plurality of industrial equipment, wherein an industrial equipment of the plurality of industrial equipment comprises the field device.

12. The system of claim 8, wherein the field device is commissioned in an intrinsically safe region for the plant or the process based at least in part on an available energy of the field device being below a level, wherein the distributed control system is further configured to communicate with the field device over the network via the APL link.

13. The system of claim 8, wherein the distributed control system is further configured to:

preload a predefined device identifier into a replacement field device, the predefined device identifier of the replacement field device corresponding to the MAC address of the field device based at least in part on the field device being replaced by the replacement field device on the network;

poll the network table for the predefined device identifier of the replacement field device to recognize a presence of the replacement field device, wherein the replacement field device is pre-registered or is registered with the network server based at least in part on being connected to the network; and in response to the distributed control system recognizing the presence of the replacement field device, authenticate and authorize the replacement field device to monitor the plant or the process.

14. The system of claim 13, wherein the network server is further configured to:

register the replacement field device with the network;

assign an additional network address to the replacement field device; and update the network table with the additional network address for the predefined device identifier of the replacement field device.

15. The system of claim 13, wherein the predefined device identifier comprises the MAC address of the field device, and wherein the replacement field device is pre-registered with the network server based at least in part on the network table comprising the MAC address of the field device.

16. A non-transitory computer medium storing computer executable code, which when executed by one or more processors, is configured to implement a method for automatic discovery of a field device, the method comprising:

receiving, by a distributed control system of a network and via a user interface to the distributed control system, a Media Access Control (MAC) address of the field device for registering the field device with a plant or process during initial commissioning;

in response to the field device connecting to the network, automatically communicating the MAC address of the field device to a network server of the network on an Advanced Physical Layer (APL) link, wherein the network server assigns a network address to the field device and stores the network address corresponding to the MAC address of the field device in a network table at the network server;

polling, by the distributed control system and using the MAC address of the field device that is registered with the distributed control system, the network table at the network server to recognize a presence of the field device installed on the network based at least in part on the network table comprising the MAC address of the field device, wherein the network table comprises MAC addresses and corresponding network addresses associated with respective field devices registered with the network server;

in response to the MAC address of the field device being available on the network table, returning the network address of the field device to the distributed control system;

in response to the network address of the field device being returned, recognizing, by the distributed control system, the presence of the field device; and authenticating and authorizing the field device for use in monitoring the plant or the process.

17. The non-transitory computer medium of claim 16, wherein the network table is asynchronously polled by the distributed control system to recognize the MAC address of the field device, and wherein the network table is a Dynamic Host Configuration Protocol (DHCP) client table.

18. The non-transitory computer medium of claim 16, wherein the method further comprises:

connecting to the network server via Ethernet to poll the network table; and controlling, based at least in part on authenticating and authorizing the field device, an industrial operation comprising a plurality of industrial equipment, wherein an industrial equipment of the plurality of industrial equipment comprises the field device.

19. The non-transitory computer medium of claim 16, wherein the field device is commissioned in an intrinsically safe region for the plant or the process based at least in part on an available energy of the field device being below a level, the method further comprising communicating, by the distributed control system, with the field device over the network via the APL link.

20. The non-transitory computer medium of claim 16, wherein the method further comprises:

preloading a predefined device identifier into a replacement field device, the predefined device identifier of the replacement field device corresponding to the MAC address of the field device based at least in part on the field device being replaced by the replacement field device on the network;

polling, by the distributed control system, the network table for the predefined device identifier of the replacement field device to recognize a presence of the replacement field device, wherein the replacement field device is pre-registered or is registered with the network server based at least in part on being connected to the network; and in response to the distributed control system recognizing the presence of the replacement field device, authenticating and authorizing the replacement field device to monitor the plant or the process.

* * * * *